United States Patent
Fenner (10) Patent No.: US 11,431,752 B2
(45) Date of Patent: Aug. 30, 2022

(54) EX POST FACTO PLATFORM CONFIGURATION ATTESTATION

(71) Applicant: Microsoft Technology Licensing, LLC, Redmond, WA (US)

(72) Inventor: Christopher E. Fenner, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1009 days.

(21) Appl. No.: 16/015,597

(22) Filed: Jun. 22, 2018

(65) Prior Publication Data

US 2019/0394241 A1     Dec. 26, 2019

(51) Int. Cl.
   *G06F 21/57*    (2013.01)
   *H04L 9/40*     (2022.01)
   *H04L 9/08*     (2006.01)
   *H04L 9/32*     (2006.01)

(52) U.S. Cl.
   CPC ............ *H04L 63/20* (2013.01); *G06F 21/575* (2013.01); *H04L 9/0877* (2013.01); *H04L 9/3234* (2013.01); *H04L 63/145* (2013.01)

(58) Field of Classification Search
   CPC ..... H04L 63/20; H04L 63/145; H04L 9/0844; H04L 9/3234; G06F 21/57; G06F 21/575
   See application file for complete search history.

(56) References Cited

U.S. PATENT DOCUMENTS

| | | | |
|---|---|---|---|
| 8,694,762 B2 * | 4/2014 | Ekberg | G06F 21/575 713/1 |
| 10,735,190 B1 * | 8/2020 | Khare | H04L 9/0877 |
| 2005/0108564 A1 * | 5/2005 | Freeman | G06F 21/575 726/26 |
| 2012/0110644 A1 | 5/2012 | Thom et al. | |
| 2012/0131334 A1 * | 5/2012 | Haikney | G06F 21/57 713/156 |
| 2017/0093800 A1 | 3/2017 | Wiseman et al. | |
| 2018/0114023 A1 * | 4/2018 | Bakthavatchalam | G06F 21/566 |
| 2021/0117534 A1 * | 4/2021 | Maximov | H04L 9/3234 |

OTHER PUBLICATIONS

Arthur, et al., "A Practical Guide to TPM 2.0: Using the New Trusted Platform Module in the New Age of Security", Retrieved from: https://link.springer.com/content/pdf/10.1007/978-1-4302-6584-9_11.pdf, Jan. 1, 2015, 14 Pages.
"International Search Report and Written Opinion Issued in PCT Application No. PCT/US2019/036209", dated Sep. 18, 2019, 12 Pages.

* cited by examiner

*Primary Examiner* — Daniel B Potratz
(74) *Attorney, Agent, or Firm* — Holzer Patel Drennan (57) ABSTRACT

Implementations described herein disclose a platform configuration register (PCR) attestation system using a trusted platform module (TPM) of a device. The PCR attestation system provides one or more computer executable instructions to create a non-volatile (NV) index in a TPM of the computing device, with a PCR policy specifying that the values of PCRs on the TPM are equal to predetermined set of values, and if the PCR policy is satisfied, setting a value of an NVWritten attribute to specify that the PCR policy was satisfied since the last time the device booted.

14 Claims, 6 Drawing Sheets

EX POST FACTO PLATFORM CONFIGURATION ATTESTATION

BACKGROUND

Trusted computing (TC) has become an important part of the computing landscape over the last few years. This is because email viruses, trojans, spyware, phishing scams, key-stroke loggers, and security exploits are so much a part of the landscape already, and trusted computing addresses these challenges not only with computing devices such as desktops and laptops, but also with mobile devices and with devices used with the Internet of things (IoT) technology. With TC, the computing device uses a trusted platform module (TPM) to secure hardware through integrated cryptographic keys. A TPM may contain several platform configuration registers (PCRs) that allow secure storage and reporting of security relevant metrics. These metrics can be used to detect changes to previous configurations and decide how to proceed.

SUMMARY

Implementations described herein disclose a platform configuration register (PCR) attestation system using a trusted platform module (TPM) of a device. The PCR attestation system provides one or more computer executable instructions to create a non-volatile (NV) index in a TPM of the computing device, with a PCR policy specifying that the values of PCRs on the TPM are equal to predetermined set of values, and if the PCR policy is satisfied, setting a value of an NVWritten attribute to specify that the PCR policy was satisfied since the last time the device booted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

A further understanding of the nature and advantages of the present technology may be realized by reference to the figures, which are described in the remaining portion of the specification.

DETAILED DESCRIPTIONS

Computing devices go through a number of states over time from the time the device is booted and through its use. As time goes on, various parameters of the computing device change before that device is rebooted. Example of some of the states may be hibernation and resume, a dynamic root of trust for measurement (DRTM) sequence (partial relaunch of operating system of the computing device), etc. These class of state changes generate changes in measurement of various parameters and these parameter measurements may be stored in platform configuration registers (PCRs) of the computing device. Therefore, the PCRs are modified as a result of these processes. Furthermore, the computing devices may also include logs of events that are measured in the PCRs. These logs, referred to as the Trusted Computing Group (TCG) logs, store detailed account of changes made to the PCRs.

Figure 3:
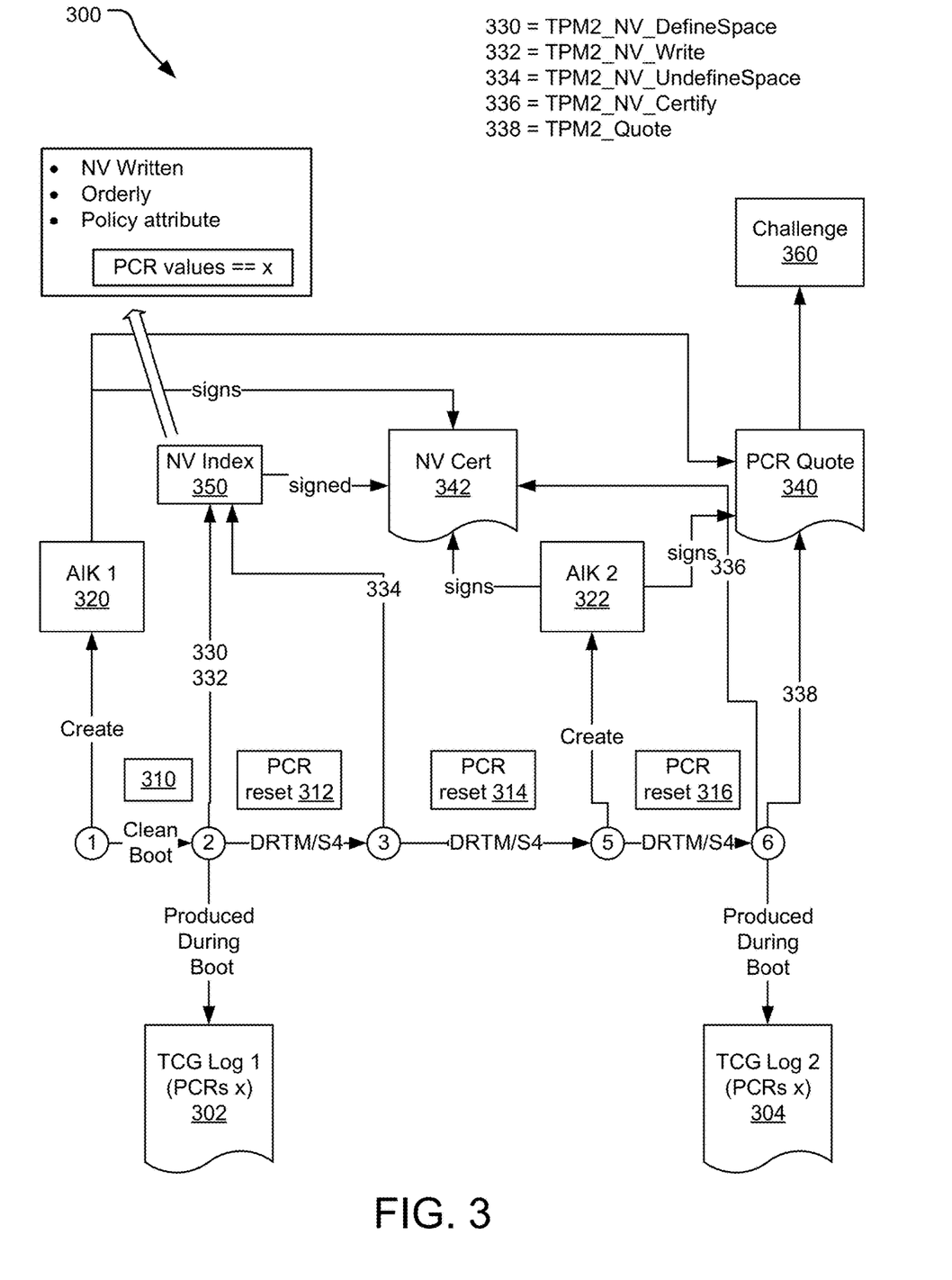
FIG. 3 illustrates an alternative example state diagram of a PCR attestation system using a TPM of a device.

The combination of the PCRs and the TCG logs of a computing device can be used by users or clients of the computing device to determine the state of the computing device at various times. Such a device's state may be attested using an attestation identity key (AIK) in the computing device's TPM. For example, an attestation server may request a status of the PCR, referred to herein as PCR quote, from the computing device's TPM, and in response an attested current value of the PCRs may be obtained. However, a party may be interested in knowing the state of the PCRs at a previous point in time after the computing device has been booted. For example, if the computing device is at state 3 (as illustrated in FIG. 3), given that the PCRs store current state measurements for state 3, a user may not be able to determine the PCR status at a previous state, such as a state 2 after last cold boot of the computing device. A cold boot, also known as a hard boot, is a reboot of the computing device where the power of the computing device is physically turned off and back on again, causing an initial boot of the computing device. Additionally, during a cold boot, system memory is not restored from disk, as is the case for S4 state resume. The system is said to have booted "from scratch" after a cold boot. The PCRs from a given state may contain measurements that took place during the boot sequence or a previous DRTM sequence. These measurements may have been overwritten by later low power state (also referred to as "S4" state) or DRTM sequences, but still be relevant to the attestation server if the device has not been booted again since that time.

Implementations disclosed herein provide a platform configuration register (PCR) attestation system using a TPM of a device. The PCR attestation system provides one or more computer executable instructions to create a non-volatile (NV) index in the TPM of the computing device, with a PCR policy specifying that the values of PCRs on the TPM are equal to predetermined set of values, and if the PCR policy is satisfied, setting a value of an "NVWritten" attribute to specify that the PCR policy was satisfied since the last time the device booted. The NV index may be used to determine a PCR state of the computing device at a given time and to ascertain that the computing device has not been booted since that previous state.

In one implementation, the TPM for a computing device may be provided as part of a device. For example, a TPM may be part of a device's microprocessor. Alternatively, a TPM may be a discrete component of the device implemented on a chip that is connected to the motherboard of the device. In such an implementation, the TPM chip may communicate with the microprocessor of the device using the system bus of the device.

Figure 1:
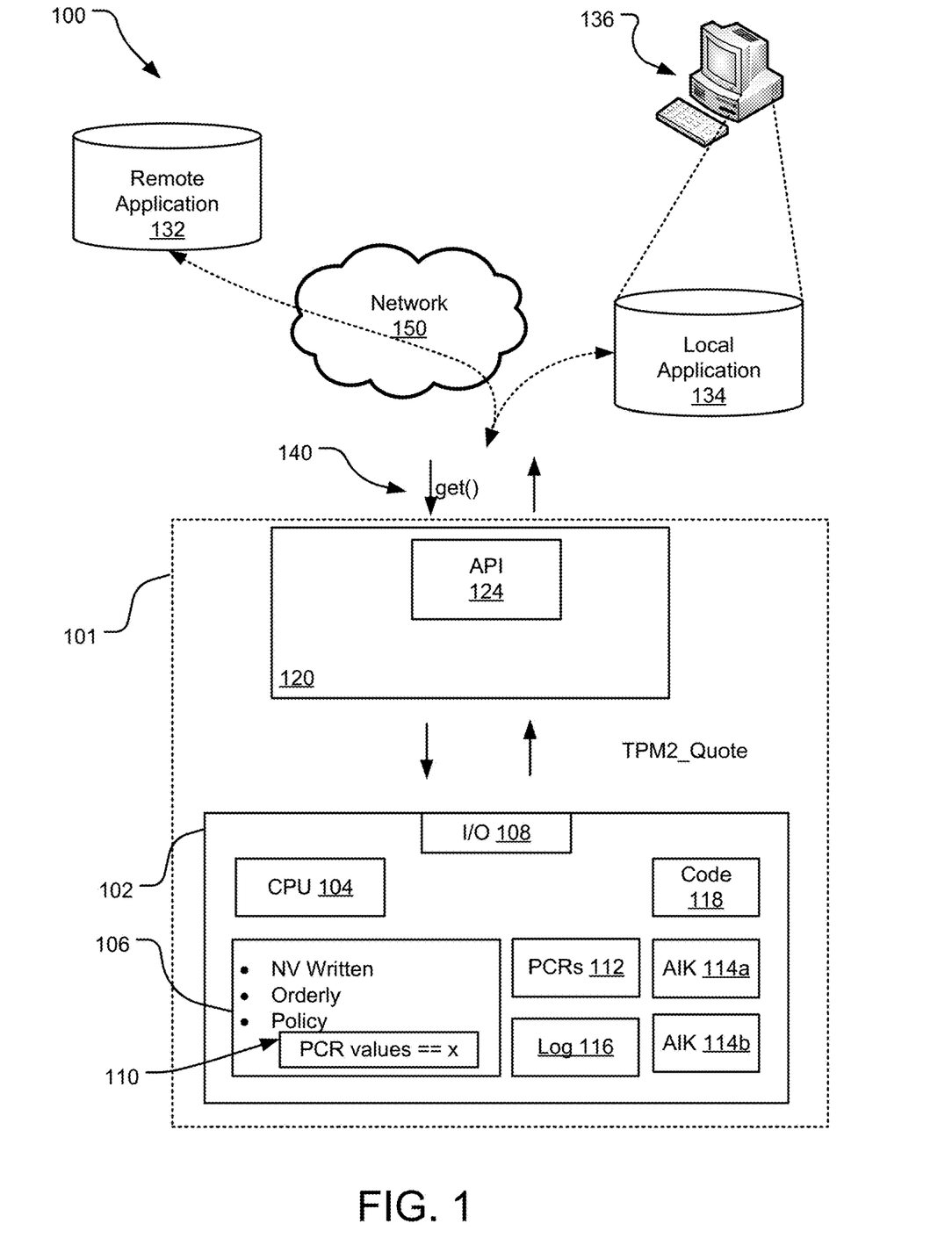
FIG. 1 illustrates an example implementation of a system for a platform configuration register (PCR) attestation system using a trusted platform module (TPM) of a device.

FIG. 1 illustrates an example implementation of a PCR attestation system 100 for providing ex post facto platform attestation for various PCR states. The PCR attestation system 100 may be implemented on a computing device 101 that is configured to have a TPM 102 thereon. The computing device 101 may be any computing device, such as a laptop, a desktop, a mobile computing device, or an internet of things (IoT) device. An example of a computing device and its components are further disclosed in FIG. 6 below.

In the implementation of the PCR attestation system 100, the TPM 102 may include a processing unit or CPU 104 and non-volatile (NV) memory to store an NV index 106, and an input/output (I/O) module 108. The TPM 102 may communicate with an operating system (OS) 120 of the computing device 101 using the I/O module 108. For example, the I/O module 108 may communicate with the OS 120 using a communication bus such as the system bus 23 disclosed in FIG. 6.

One or more external applications such as a remote application 132 or a local application 134 residing on a computer 136 may communicate with the computing device 101 to request the PCR attestation system 100 of the computing device 101. For example, the remote application 132 may be a social media application that communicates with the computing device 101 using a network 150, such as the Internet, to request the PCR attestation of the computing device 101 by sending a get request 140 to the operating system 120 of the computing device 101.

In one implementation, the computing device 101 also includes a number of PCRs 112 and a PCR log 116. In response to the get request 140, the operating system 120 may generate and send a TPM2_Quote command to the TPM 102. In response, the TPM 102 may generate a PCR quote with values of the PCRs 112, attest it using a TPM 102 AIK, such as an AIK 114a, AIK 114b, etc., and send the attested PCR quote to the operating system 120. For example, the TPM 102 may include computing code 118 to generate such attested PCR quote.

In one implementation of the TPM 102, the computing code 118 is also configured to determine if the computing device 101 has been cold-booted and in response to such determination, the computing code 118 generates a non-volatile (NV) index 106. The NV index 106 may store various attributes and a policy 110 that specifies that to modify the NV index 106, the PCR 112 values are in a given state. For example, in one implementation, the policy 110 may be for the current PCR 112 values. As a result, the values of the PCRs 112 needed to write to the NV index 106 are saved as part of the NV index 106. Thus, at a later state, the previous state of the PCRs 112 may be verified using the policy 110 and the NVWritten and Orderly attributes of the NV index 106.

The NV index 106 may also include an "orderly" attribute. In one implementation, the orderly attribute may require that a "written" attribute is CLEAR on reboot. The attributes of the NV index 106 may be flags that take specific values. For example, the "orderly" attribute of the NV index 106 may take a value of "1" or "0" with one of these values notifying CLEAR on reboot state. Furthermore, the NV index 106 may also include an "NVwritten" attribute with the value of the "NVwritten" attribute being set when the NV index 106 is written to. For example, until the NV index 106 is written to, the value of the "NVWritten" attribute may be zero (0), however, when an entity writes to the NV index 106, the value of the "NVWritten" attribute may be set to one (1). Thus, the value of the "NVWritten" attribute of the NV index 106 can be used to indicate that while a given NV index 106 is defined, whether it is written to or not.

In one implementation of the NV index 106, there may be no restrictions on read access to the NV index 106. This may be specified by an "AUTHREAD" attribute that, in combination with a zero-length AUTH value, specifies that all entities, including the owner of the computing device 101, the platform of the computing device 101 is implemented on, etc., can read the content of the NV index 106. In an alternative implementation, an attribute may be provided that specifies which entities can write to or modify the NV index 106. Furthermore, the content of the NV index 106 may be an arbitrary number that may be used to specify the version of the NV index 106. In such an implementation, the content of the NV index 106 may be changed when, for example, the design of the policy 110 of the NV index 106 is changed.

Figure 2:
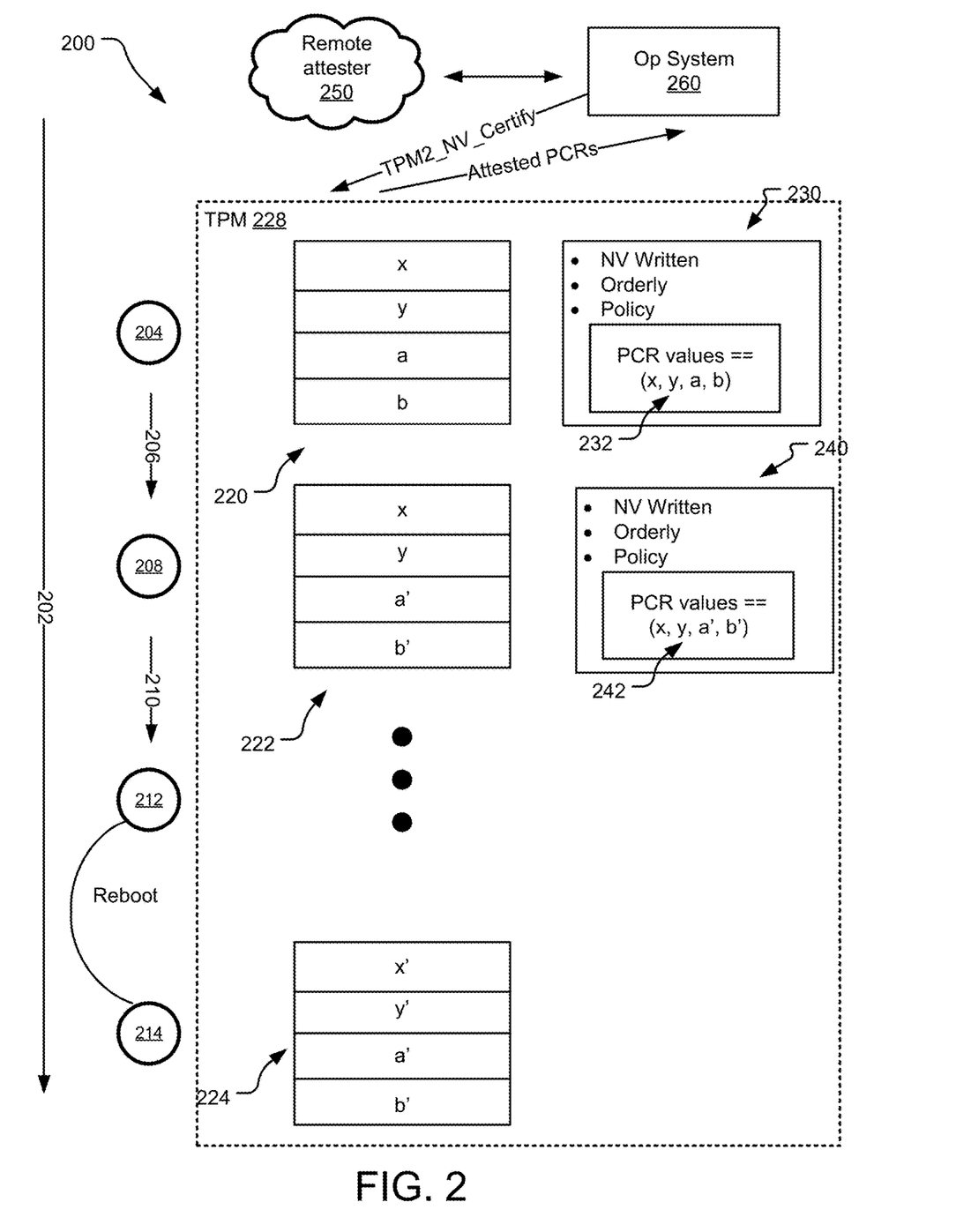
FIG. 2 illustrates an example state diagram of a PCR attestation system using a TPM of a device.

FIG. 2 illustrates an example state diagram 200 of a PCR attestation system using a TPM of a device. Specifically, the state diagram 200 illustrates various states of a computing device along a time line 202 and corresponding PCRs as well as NV indices in a TPM 228. For example, the computing device may have just completed a cold boot at a state 204. Subsequently, something may change the PCR state, such as a DRTM sequence 206, resulting in a new state 208, a hibernation 210, resulting in a new state 212, etc. Furthermore, after state 212 there may be a reboot resulting in state 214. Each of the states 204-212 may be have corresponding values of PCRs. For example, the values of PCRs 220 at state 204 may be (x, y, a, b), the values of PCRs 222 at state 208 may have changed to (x, y, a', b'), the values of the PCRs 224 at state 214 may have changed to (x', y', a', b').

FIG. 2 also illustrates NV indexes for various computing device states. For example, an NV index 230 is related to the computing device state 204 with a PCR policy 232 that specifies that the PCR values are equal to the current values of the PCRs as specified by 220. Similarly, an NV index 240 is related to the computing device state 208 with a PCR policy 242 that specifies that the PCR values are equal to the current values of the PCRs as specified by 222.

A remote attester 250 may request a PCR state attestation from an operating system 260 of the computing device for state 204, from a new state 208 or 212, or any future state until the device is rebooted. In response, the operating system 260 sends a TPM2_NV_Certify command to the TPM 228. In response, the TPM 228 may send attested NV index attributes as determined based on the PCR policy 232 from the NV index 230 associated with state 204. The remote attester 250 can verify that the certified NV index 230 has a PCR policy 232 which required the PCR state associated with state 204, and attributes that indicate that the policy was satisfied since the last cold reboot of the system. It can then conclude that the system was in the state 204 since the last cold reboot of the system.

FIG. 3 illustrates an alternative example state diagram 300 of a PCR attestation system using a TPM of a computing device. In this implementation, circles (1) . . . (6) represent system states of the computing device. An AIK, to be referred to as "AIK 1" 320 is created in this state (1). The system is rebooted between states (1) and (2), and DRTM or S4 resume is performed between each subsequent state. An NV index 350 is created in state (2) using a TPM_NV_DefineSpace command 330 and it is written to using a TPM2_NV_Write command 332. Some other AIK, called "AIK 2" 322 is created in state (5). Platform Attestation occurs in state (6). The arrow 334 coming from state (3) represents the possibility that attestation of state (2) can be manually revoked by undefining the NV index 350 using the TPM2_NV_UndefineSpace command 334.

If the NV index 350 is not revoked, the AIK 2 322 created in state (5) can certify that the device was previously in state (2) since the last cold boot, even from state (6) using a TPM2_NV_Certify command 336. During Platform Attestation, the attributes and policy on the certified NV 342 are checked. The TCG log 302 stores log events relevant to state (2) and TCG log 304 stores log events relevant to state (6). A PCR quote 340 generated at state (6) using a TPM2_Quote command 338 may also be signed by the AIK 2 322 and sent to a remote attester in response to a challenge 360 from such a remote attester. A valid response to this challenge indicates that the device is currently in state (6).

Furthermore, 310 represents resetting of the NV index 350's Written attribute (since it also has the Orderly attribute) and each of 312, 314, and 316 represents, respectively, the PCRs at states (2), (3) and (5).

Figure 4:
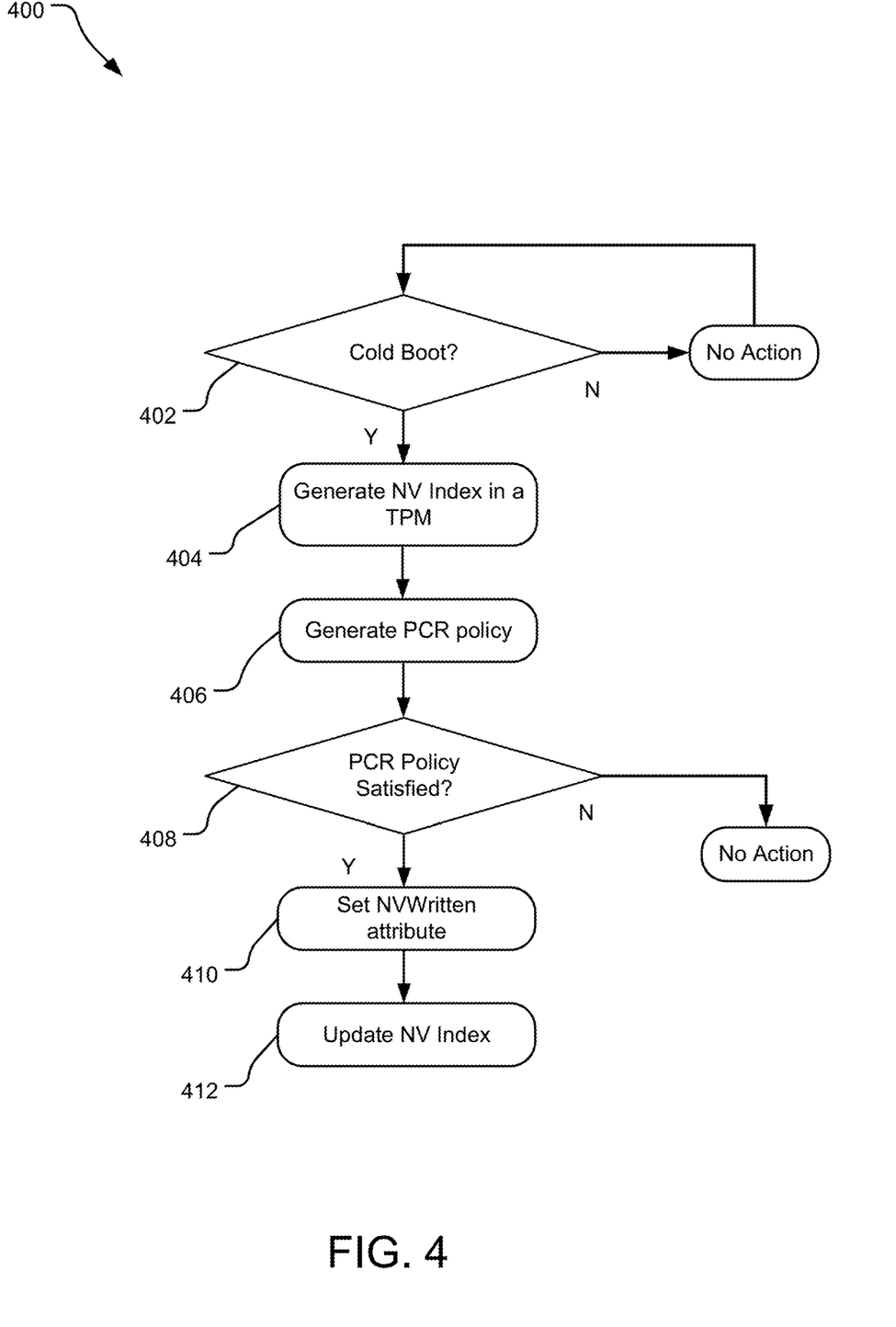
FIG. 4 illustrates example operations for generating a non-volatile (NV) index for providing PCR attestation using a TPM of a device.

FIG. 4 illustrates operations 400 for generating a non-volatile (NV) index for providing PCR attestation using a TPM of a device. The operations 400 may be implemented in a TPM of a device. An operation 402 determines a cold boot of a computing device. In response, an operation 404 generates an NV index in the TPM and an operation 406 generates a PCR policy for the NV Index. An operation 408 evaluates the PCR policy with the current PCR values and if the PCR policy is satisfied by determining that the PCR values as per the PCR policy are similar to the current values of the PCRs, an operation 410 sets a NVWritten attribute to indicate that the NV index's PCR policy has been satisfied and the index has been written. The NV index is updated at an operation 412.

Figure 5:
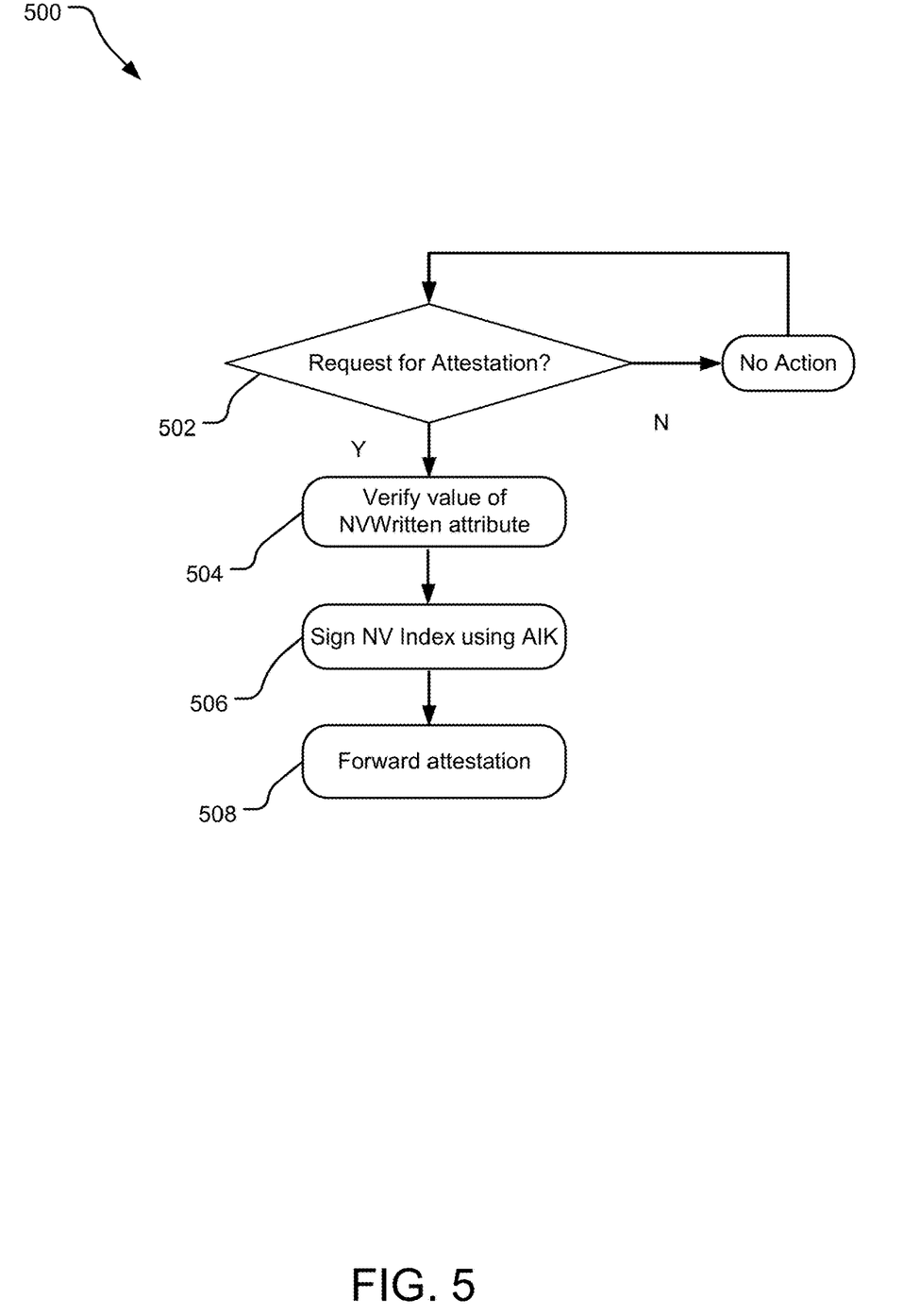
FIG. 5 illustrates example operations for providing ex-post PCR attestation using a TPM of a device.

FIG. 5 illustrates example operations 500 for providing ex-post-facto PCR attestation using a TPM of a device. The operations 500 may be implemented in a TPM of a device. An operation 502 determines if a request for PCR state attestation is received. If so, an operation 504 verifies values of all attributes (including Written and Orderly) and the policy (which is associated with the PCR values) of an NV index. Subsequently, an operation 506 signs the NV Index's attributes and policy using an AIK from the TPM and an operation 508 forwards the signed attestation to the requestor.

Figure 6:
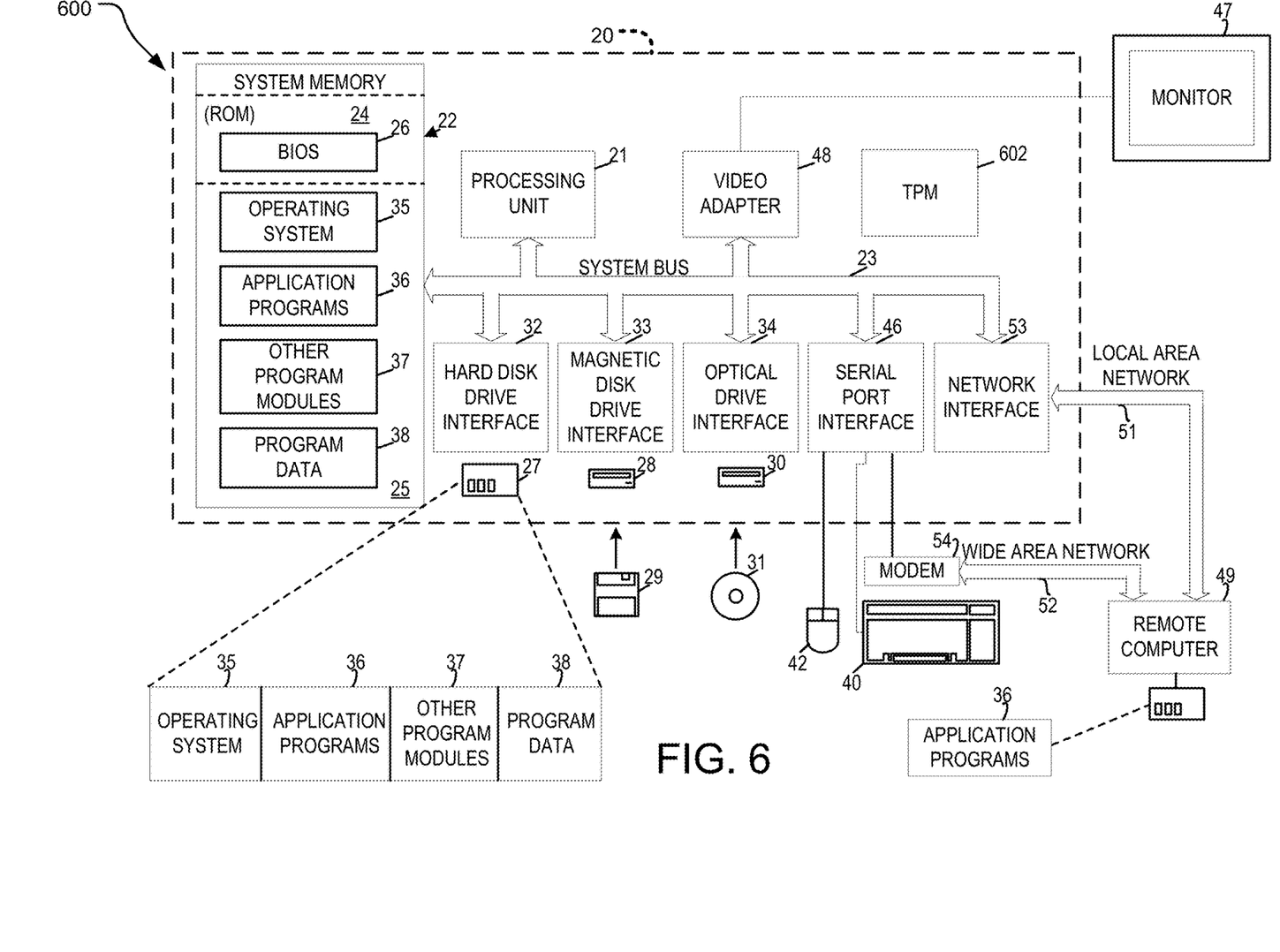
FIG. 6 illustrates an example system that may be useful in implementing the described technology.

FIG. 6 illustrates an example system 600 that may be useful in implementing the described technology for providing PCR attestation using a TPM of a computing device. The example hardware and operating environment of FIG. 6 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of the computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory 22 may also be referred to as simply the memory 22, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 28, optical disk 30, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB) (not shown). A monitor 47 or other type of display device is also connected to the system bus 23 via an interface, such as a video adapter 48. In addition to the monitor 47, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment 51, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for providing attestable and destructible device identity may be stored in memory 22 and/or storage devices 29 or 31 and processed by the processing unit 21. Rules for providing attestable and destructible device identity may be stored in memory 22 and/or storage devices 29 or 31 as persistent datastores. For example, a TPM module 602 may be implemented on the computer 20 for providing PCR attestation (alternatively, the TPM module 602 may be implemented on a server or in a cloud environment). The TPM module 602 may utilize one of more of the processing unit 21, the memory 22, the system bus 23, and other components of the personal computer 20.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The system for providing PCR attestation using a TPM module may include a variety of tangible computer-readable storage media and intangible computer-readable communication signals. Tangible computer-readable storage can be embodied by any available media that can be accessed by the PCR attestation system 100 (as disclosed in FIG. 1) and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the attestable and destructible device identity system 100 (as disclosed in FIG. 1). In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The PCR attestation system disclosed herein provides a solution to a technological problem necessitated by problem of computing devices being hacked by various malware and the inability and/or inefficiency of the other solutions to be able to support a large number of PCR attestation requests in a timely manner. Specifically, the PCR attestation system disclosed herein provides an unconventional technical solution to this technological problem by providing TPM based NV index to store a PCR policy specifying that the values of PCRs on the TPM are equal to predetermined set of values, and if the PCR policy is satisfied, reset a value of an NVWritten attribute to specify a cold boot of the computing device.

A physical article of manufacture disclosed herein includes one or more tangible computer-readable storage media, encoding computer-executable instructions for executing on a computing device a computer process comprising creating a non-volatile (NV) index in a trusted platform module (TPM) of a device with a platform configuration registers (PCR) policy specifying that values of PCRs on the TPM are equal to a predetermined set of values and if the PCR policy is satisfied, setting a value of an NVWritten attribute to specify that the PCR policy was satisfied since last time the device was cold booted. In one implementation, the PCR policy further specifies that the values of PCRs are equal to their current values.

In one alternate implementation, the computer process further includes determining if a cold boot has been performed on the computing device and in response to determining a cold boot of the computing device, creating the NV index. Alternatively, the computer process further includes signing the NV index using an attestation identity key (AIK) of the TPM. Yet alternatively, the computer process further includes verifying the value of the NVWritten attribute and in response to verifying the value of the NVWritten attribute to indicate that the computing device has not been rebooted since the NV index was generated, attesting to a previous state of the TPM.

In one implementation, attesting to the previous state of the TPM further comprises signing the NV index using a newly generated attestation identity key (AIK). In another implementation, attesting to the previous state of the TPM further comprises attesting that a log of events in the PCRs indicates the current state of the computing device since the last boot of the computing device. In one implementation, the computer process further includes deleting the NV index in response to determining presence of a malware attack. In another implementation, the computer process further includes writing one or more attributes of the NV index in response to determining initiation of a clean shutdown of the computing device.

A method disclosed herein includes generating a non-volatile (NV) index in a trusted platform module (TPM) of a device with a platform configuration registers (PCR) policy specifying that values of PCRs on the TPM are equal to a predetermined set of values and in response to determining that the PCR policy is satisfied, setting a value of an NVWritten attribute to specify that the PCR policy was satisfied since last time the device cold booted. In one implementation, the PCR policy specifying that the values of the PCRs on the TPM are equal to predetermined set of values. In another implementation, the PCR policy further specifies that the values of PCRs are equal to their current values. Yet another implementation further includes writing one or more attributes of the NV index in response to determining initiation of a clean shutdown of the computing device.

In one alternative implementation, the method further includes verifying the value of the NVWritten attribute and in response to verifying the value of the NVWritten attribute to indicate that the computing device has not been rebooted since the NV index was generated, attesting to a previous state of the TPM. In one implementation, attesting to the previous state of the TPM further comprises signing the NV index using a newly generated attestation identity key (AIK). In another implementation, attesting to the previous state of the TPM further comprises attesting that a log of events in the PCRs indicates the current state of the computing device since the last boot of the computing device.

A system disclosed herein includes a memory, one or more processor units, a platform configuration register (PCR) attestation system stored in the memory and executable by the one or more processor units, the PCR attestation system encoding computer-executable instructions on the memory for executing on the one or more processor units, the computer process including determining if a cold boot has been performed on the computing device and in response to determining a cold boot of the computing device, generating a non-volatile (NV) index in a trusted platform module (TPM) of a device, generating a PCR policy specifying that values of PCRs on the TPM are equal to a predetermined set of values, and in response to determining that the PCR policy is satisfied, resetting a value of an NVWritten attribute to specify that the PCR policy was satisfied since last time the device was cold booted.

In one implementation, the PCR policy further specifies that the values of PCRs are equal to their current values. In another implementation, the computer process further comprising verifying the value of the NVWritten attribute and in response to verifying the value of the NVWritten attribute to indicate that the computing device has not been rebooted since the NV index was generated, attesting to a previous state of the TPM. Alternatively, attesting to the previous state of the TPM further comprises signing the NV index using a newly generated attestation identity key (AIK).

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A physical article of manufacture including one or more tangible computer-readable storage media encoding computer-executable instructions for executing on a computing device a computer process comprising:
creating a non-volatile (NV) index in a trusted platform module (TPM) of a device with a platform configuration register (PCR) policy specifying that values of PCRs on the TPM are equal to a predetermined set of values;
evaluating the PCR policy;
in response to determining that the PCR policy is satisfied, setting a value of an NVWritten attribute to specify that the PCR policy was satisfied since last time the device was cold booted; and
attesting to a previous state of the TPM by signing the NV index using a newly generated attestation identity key (AIK), wherein attesting to the previous state of the TPM further comprises:
verifying the value of the NVWritten attribute; and
in response to verifying the value of the NVWritten attribute to indicate that the computing device has not been rebooted since the NV index was generated, attesting to the previous state of the TPM.

2. The physical article of manufacture of claim 1, wherein the PCR policy further specifies that the values of PCRs are equal to their current values.

3. The physical article of manufacture of claim 1, the computer process further comprising determining if a cold boot has been performed on the computing device and in response to determining a cold boot of the computing device, creating the NV index.

4. The physical article of manufacture of claim 1, wherein the computer process further comprising signing the NV index using the attestation identity key (AIK).

5. The physical article of manufacturer of claim 1, wherein attesting to the previous state of the TPM further comprises attesting that a log of events in the PCRs indicates the current state of the computing device since the last boot of the computing device.

6. The physical article of manufacture of claim 1, wherein the computer process further comprising deleting the NV index in response to determining presence of a malware attack.

7. The physical article of manufacture of claim 1, wherein the computer process further comprising writing one or more attributes of the NV index in response to determining initiation of a clean shutdown of the computing device.

8. In a computing environment, a method performed at least in part on at least one processor of a computing device, the method comprising:
generating a non-volatile (NV) index in a trusted platform module (TPM) of a device with a platform configuration register (PCR) policy specifying that values of PCRs on the TPM are equal to a predetermined set of values;
evaluating the PCR policy;

in response to determining that the PCR policy is satisfied, setting a value of an NVWritten attribute to specify that the PCR policy was satisfied since last time the device cold booted; and attesting to a previous state of the TPM by signing the NV index using a newly generated attestation identity key (AIK), wherein attesting to the previous state of the TPM comprises:
verifying the value of the NVWritten attribute; and
in response to verifying that the value of the NVWritten attribute indicates that the computing device has not been rebooted since the NV index was generated, attesting to the previous state of the TPM.

9. The method of claim 8, further deleting the NV index in response to determining presence of a malware attack.

10. The method of claim 9, wherein the PCR policy further specifies that the values of PCRs are equal to their current values.

11. The method of claim 8, further comprising writing one or more attributes of the NV index in response to determining initiation of a clean shutdown of the computing device.

12. The method of claim 8, wherein attesting to the previous state of the TPM further comprises attesting that a log of events in the PCRs indicates the current state of the computing device since the last boot of the computing device.

13. In a computing environment, a system comprising:
memory;
one or more processor units;
a platform configuration register (PCR) attestation system stored in the memory and executable by the one or more processor units, the PCR attestation system encoding computer-executable instructions on the memory for executing on the one or more processor units, a computer process comprising:
determining if a cold boot has been performed on the computing device; and
in response to determining that a cold boot has been performed on the computing device:
generating a non-volatile (NV) index in a trusted platform module (TPM) of a device,
generating a PCR policy specifying that values of PCRs on the TPM are equal to a predetermined set of values,
in response to determining that the PCR policy is satisfied, resetting a value of an NVWritten attribute to specify that the PCR policy was satisfied since last time the device was cold boot; and
attesting to a previous state of the TPM by signing the NV index using a newly generated attestation identity key (AIK), wherein attesting to the previous state of the TPM comprises verifying the value of the NVWritten attribute and in response to verifying that the value of the NVWritten attribute indicates that the computing device has not been rebooted since the NV index was generated, attesting to the previous state of the TPM.

14. The system of claim 13, wherein the PCR policy further specifies that the values of PCRs are equal to their current values.

* * * * *